United States Patent
Schuetz

(10) Patent No.: US 11,024,890 B2
(45) Date of Patent: Jun. 1, 2021

(54) TRANSMITTING DEVICE FOR TRANSMITTING ELECTRICAL SIGNALS FROM AT LEAST ONE GALVANIC CELL TO AT LEAST ONE ELECTRONIC EVALUATING UNIT

(71) Applicant: Robert Bosch GmbH, Stuttgart (DE)

(72) Inventor: Jonas Schuetz, Stuttgart-Bad Cannstatt (DE)

(73) Assignee: Robert Bosch GmbH, Stuttgart (DE)

( * ) Notice: Subject to any disclaimer, the term of this patent is extended or adjusted under 35 U.S.C. 154(b) by 1133 days.

(21) Appl. No.: 15/321,737

(22) PCT Filed: Jun. 2, 2015

(86) PCT No.: PCT/EP2015/062217
§ 371 (c)(1),
(2) Date: Dec. 22, 2016

(87) PCT Pub. No.: WO2015/197319
PCT Pub. Date: Dec. 30, 2015

(65) Prior Publication Data
US 2017/0133724 A1    May 11, 2017

(30) Foreign Application Priority Data
Jun. 26, 2014   (DE) ..................... 10 2014 212 251.1

(51) Int. Cl.
*H01M 10/42*   (2006.01)
*H01M 2/10*    (2006.01)
(Continued)

(52) U.S. Cl.
CPC ....... *H01M 10/425* (2013.01); *H01M 10/482* (2013.01); *H01M 50/20* (2021.01); *H01M 2010/4278* (2013.01); *H01M 2220/20* (2013.01)

(58) Field of Classification Search
CPC ............. H01M 10/425; H01M 10/482; H01M 10/486; H01M 2010/4278; H01M 2/202;
(Continued)

(56) References Cited

U.S. PATENT DOCUMENTS 4,485,683 A * 12/1984 Hass ...................... B23K 11/25
                                                        73/862.53
5,250,904 A * 10/1993 Salander ............... H02J 7/0047
                                                        324/430
(Continued)

FOREIGN PATENT DOCUMENTS

CN      102089902 A     6/2011
CN      102859755 A     1/2013
(Continued)

OTHER PUBLICATIONS

International Search Report for Application No. PCT/EP2015/062217 dated Jul. 13, 2015 (English Translation, 3 pages).

*Primary Examiner* — Imran Akram
(74) *Attorney, Agent, or Firm* — Michael Best & Friedrich LLP

(57) ABSTRACT

The invention relates to a transmitting device for transmitting electrical signals from at least one galvanic cell to at least one electronic evaluating unit, wherein the transmitting device has at least one cell connection element for electrically connecting at least a first galvanic cell to a second galvanic cell and has a flat cable arranged directly on the cell connection element, wherein the flat cable extends from the cell connection element to an electronic evaluating unit for evaluating the electrical signals. The invention further relates to a rechargeable energy storage unit at least for storing electrical energy, comprising at least two galvanic cells electrically connected to each other and a transmitting device, and to the use of at least one flat cable for transmit- (Continued)

ting electrical signals from at least one galvanic cell to at least one electronic evaluating unit.

8 Claims, 2 Drawing Sheets

(51) Int. Cl.
  *H01M 10/48* (2006.01)
  *H01M 50/20* (2021.01)
(58) Field of Classification Search
  CPC ............ H01M 10/02; H01M 10/4257; H01M 10/4271
  See application file for complete search history.

(56) References Cited

U.S. PATENT DOCUMENTS

| | | | | |
|---|---|---|---|---|
| RE35,643 E | * | 10/1997 | Gali | H02J 7/02 320/119 |
| 5,709,964 A | * | 1/1998 | Christensen | H01M 50/213 429/153 |
| 5,746,905 A | * | 5/1998 | Murray | G01N 27/02 205/776.5 |
| 5,801,512 A | * | 9/1998 | Adams | H01M 2/1055 320/137 |
| 6,531,876 B1 | | 3/2003 | Einhart et al. | |
| 2003/0068559 A1 | * | 4/2003 | Armstrong | H01M 6/42 429/234 |
| 2004/0009334 A1 | | 1/2004 | Miyamoto et al. | |
| 2005/0088144 A1 | * | 4/2005 | Pacholok | H02J 7/022 320/131 |
| 2006/0261783 A1 | * | 11/2006 | Gamboa | H02J 7/0072 320/138 |
| 2010/0055993 A1 | * | 3/2010 | Ikeda | H01M 50/502 439/754 |
| 2010/0073005 A1 | * | 3/2010 | Yano | H01M 10/486 324/427 |
| 2010/0248008 A1 | * | 9/2010 | Sugawara | H01M 50/20 429/159 |
| 2012/0082876 A1 | * | 4/2012 | Yamamoto | H01M 10/482 429/90 |
| 2012/0103388 A1 | * | 5/2012 | Meakin | B32B 17/10018 136/244 |
| 2012/0135296 A1 | * | 5/2012 | Itoi | H01M 50/502 429/159 |
| 2012/0328920 A1 | | 12/2012 | Takase et al. | |
| 2013/0122748 A1 | * | 5/2013 | Rapisarda | H01M 50/216 439/629 |
| 2013/0143101 A1 | * | 6/2013 | Nakagawa | H01M 50/543 429/157 |
| 2013/0236745 A1 | * | 9/2013 | Norton | H01M 2/1077 429/7 |
| 2013/0244499 A1 | | 9/2013 | Heck et al. | |
| 2013/0288530 A1 | * | 10/2013 | Zhao | H01M 2/34 439/627 |
| 2013/0337299 A1 | * | 12/2013 | Sugawara | H01M 10/482 429/61 |
| 2014/0196768 A1 | * | 7/2014 | Heng | H01L 31/0201 136/251 |
| 2014/0220420 A1 | * | 8/2014 | Yoshioka | H01M 10/482 429/158 |
| 2014/0239997 A1 | * | 8/2014 | Higuchi | H02S 50/10 324/756.03 |
| 2014/0345675 A1 | * | 11/2014 | Clark | H01L 31/0504 136/251 |
| 2014/0352777 A1 | * | 12/2014 | Hachtmann | H01L 31/206 136/256 |

FOREIGN PATENT DOCUMENTS

| | | |
|---|---|---|
| DE | 102009058723 | 6/2011 |
| DE | 102010043885 | 3/2012 |
| DE | 102012005120 | 9/2013 |
| DE | 102012223031 | 6/2014 |
| EP | 1088241 | 7/2002 |
| EP | 2770553 | 8/2014 |
| JP | 2012174457 | 9/2012 |
| WO | 9900004 | 1/1999 |
| WO | 0115259 | 3/2001 |
| WO | 2013058322 | 4/2013 |

* cited by examiner

TRANSMITTING DEVICE FOR TRANSMITTING ELECTRICAL SIGNALS FROM AT LEAST ONE GALVANIC CELL TO AT LEAST ONE ELECTRONIC EVALUATING UNIT

BACKGROUND OF THE INVENTION

The present invention relates to a transmission apparatus for transmitting electrical signals from at least one galvanic cell to at least one electronic evaluation unit. Further, the present invention relates to a rechargeable energy storage unit and to the use of at least one ribbon line for transmitting electrical signals.

It is fundamentally known that batteries and storage batteries, such as particularly lithium ion batteries, consist of at least one battery cell module or of a plurality of battery cell modules. A single battery cell module advantageously has a multiplicity of single battery cells that are connected up to one another to form a battery cell module or battery pack. It is thus conceivable for the individual battery cells or cells to be connected up to one another in the form of the series circuit or in the form of the parallel circuit. In the case of the series circuit, the individual cells are connected in succession, the connections between them having no branches. Advantageously, when individual cells are connected in series, the voltage of the entire battery or of the entire storage battery increases, while in the case of a parallel circuit connecting the individual cells to one another, the current level from the battery or from the entire storage battery is increased. Furthermore, it is fundamentally known practice to prevent damage and particularly failure of the storage battery or of the battery, for example, by advantageously monitoring values for the voltages and/or for the temperature of each individual cell, which can also be referred to as a galvanic cell, for example. For this, electrical monitoring of each individual cell by means of voltage taps, which are screwed or welded onto the cell connectors, is fundamentally known. Cell connectors are advantageously connecting elements, such as jumpers or terminals, for example, that electrically connect the individual cells to one another in the case of a parallel circuit or a series circuit. The values for the cell voltage or for the temperature of the individual cells are then forwarded via the voltage taps to an electronic evaluation unit (CSC), which is installed inside the housing of the battery or of the storage battery itself, for example. It is furthermore possible for the captured values or data to be forwarded from the evaluation unit to a controller or a control unit, for example for the purpose of providing and/or storing the data.

The fundamentally known voltage taps are configured in different geometric embodiments, so that they may be present as lines or bonding wire connections. Particularly the bonding wires serving as voltage taps have a very thin cross section, however, and accordingly, disadvantageously, low robustness. This means that even if the individual cells move just slightly among one another within the module complex, the loads acting on the bonding wires can cause damage to the bonding wire connections on account of the tensile, compressive and flexural forces, as a result of which said bonding wire connections even crack. A further disadvantage, in the case of the connection of the fundamentally known voltage taps in the form of lines or bonding wire connections, can be regarded as the resultant high contact resistance between the voltage taps and the cell connector, which arises not only as a result of the voltage taps needing to be welded or screwed onto the cell connector, for example, but also from the fact that the weld joints or screw joints can detach or loosen, owing to the movement of the individual cells in the battery pack among one another. An increase in a contact resistance from a tap to the cell connector can also disadvantageously lead to faults in the electronics as a result of the heat generation from the voltage tap. Additionally, the increase in the contact resistance from a tap to the cell connector can also lead to a loss of voltage. It has also been found that the cell terminals are difficult to bond insofar as the terminals move to a minimal degree. The machine exerts slight pressure on the cell terminals in order to firmly weld the bond by means of friction welding, this movement being transferred to the terminal, as a result of which the latter moves too greatly. Therefore, bonding is very difficult depending on the cell type and depending on the mechanical structure of the cell, this also having been shown in latest tests. Similarly, the CSC unit needs to be mounted on the module completely rigidly without any movement in order for there to be no movement present in this case either.

EP 1 088 241 B1 shows particularly the arrangement of a contact-connection unit for tapping off the voltage values from a cell of a battery. In this case, the contact-connection unit is connected to the evaluation unit indirectly. In order to connect the contact-connection unit itself to the evaluation unit, there is a ribbon line provided between the contact-connection unit and the evaluation unit or an intermediate unit. The contact-connection unit itself has a multiplicity of individual interconnected components, however, which have to make contact with one another constantly in order to transmit the voltage values. Therefore, even the arrangement of a corresponding contact-connection unit encounters the risk of the individual components of the contact-connection unit being displaced among one another in the event of movement between the individual cells of the module complex of a battery or of a storage battery. This may at least intermittently and/or partly break a contact connection, so that individual values and particularly voltage values or temperature values can no longer be captured from the galvanic cell and therefore also no longer transmitted to the evaluation unit.

SUMMARY OF THE INVENTION

It is therefore the object of the present invention to at least partly eliminate the disadvantages described above for an apparatus for ascertaining the voltage values and/or temperature values of a cell, particularly a galvanic cell. In particular, it is the object of the present invention to provide a transmission apparatus for transmitting electrical signals from at least one galvanic cell to at least one electronic evaluation unit, by means of which individual values or data, such as the cell voltage or the temperature of the cell, can be captured and transmitted from the individual cell to the electronic evaluation unit in a simple and inexpensive manner, the transmission apparatus itself being intended to be arrangeable in a space-saving manner and to be flexibly deformable with zero damage, in order also to allow the individual cells to move among one another.

The above object is achieved by a transmission apparatus for transmitting electrical signals from at least one galvanic cell to at least one electronic evaluation unit according to the invention, and by a rechargeable energy storage unit at least for storing electric power according to the invention. Further, the above object is achieved by the use of at least one ribbon line for transmitting electrical signals from at least one galvanic cell to at least one electronic evaluation unit according to the invention. Further features and details of the invention will emerge from the subclaims, the description and the drawings. In this case, features and details that are described in connection with the transmission apparatus naturally also apply in connection with the rechargeable energy storage unit according to the invention and/or the use of at least one ribbon line, and vice versa in each case, so that reciprocal reference is or can always be made in respect of disclosure pertaining to the individual aspects of the invention.

The transmission apparatus for transmitting electrical signals from at least one galvanic cell to at least one electronic evaluation unit has at least one cell connecting element for electrically connecting up at least one first galvanic cell to a second galvanic cell and a ribbon line arranged directly on the cell connecting element, the ribbon line extending from the cell connecting element to an electronic evaluation unit for evaluating the electrical signals. Within the context of the present invention, the ribbon line is understood to mean a special form of the ribbon cable. In the case of the ribbon line understood within the context of the invention, particularly at least one interconnect is put on a plastic film, it also being possible for a plurality of interconnects and, by way of example, two or more interconnects to be put on a common plastic film. When there are a plurality of interconnects, these advantageously extend at least in sections at a distance from one another next to one another on the plastic film. A flexible lead, as in the case of a ribbon cable, for example, is advantageously not present in the case of the ribbon line itself. Advantageously, ribbon lines have very small dimensions and can be manufactured as a molded part. Ribbon lines are very flexible and are bendable or foldable in different directions.

Within the context of the invention, the cell connecting element is understood to mean a cell connector that electrically connects the individual cells, particularly the individual galvanic cells, to one another. The individual galvanic cells can advantageously be assembled in a package or module, this cell module, depending on the desired voltage or current level, being able to be connected up in series or in parallel with one another or being able to be arranged in column form or circular form relative to one another. Advantageously, the cell connecting elements may have a different configuration and consequently be configured in the form of a simple strip or in the form of an H connector having appropriately punched-out sections. Advantageously, the transmission apparatus according to the invention is used to transmit at least one electrical signal and particularly at least one value for the cell voltage and/or the temperature of at least one galvanic cell to the evaluation unit.

The evaluation unit itself is advantageously connected to a control unit by means of which the values can be evaluated and advantageously processed further or even stored at least in the short term. Within the context of the invention, a galvanic cell is understood to mean particularly a galvanic element by means of which electric power can be converted from chemical energy. The galvanic cell itself is advantageously part of a storage battery or of a battery and is used to store electric power and to output said electric power to a consumer or a load in accordance with requirements. Particularly in order to be able to monitor whether the individual galvanic cells work effectively and consequently the power delivered by the galvanic cells is sufficient, or in order to monitor the temperature of the individual galvanic cells, in order to prevent damage to the galvanic cells on account of their being overheated or undercooled, for example, it is consequently necessary to ascertain and accordingly evaluate the values for the voltage and for the temperature of the galvanic cells of a storage battery or of a battery, advantageously at regular intervals.

Advantageously, the transmission apparatus according to the invention increases the flexibility between the individual galvanic cells and particularly between the galvanic cell and the electronic evaluation unit to the extent that even if the individual galvanic cells move among one another, an interruption, for example on account of a wire fracture, between the galvanic cell and the evaluation unit is avoided. Consequently, even when the storage battery and particularly the cell module or pack, which advantageously has at least two galvanic cells, is in heavy use, disturbance-free transmission of the values from the galvanic cell for the voltage and/or temperature is ensured. Furthermore, the transmission apparatus according to the invention is advantageously arrangeable in space-saving fashion within the storage battery or the housing of the storage battery and allows simple and inexpensive networking of the galvanic cells among one another or of the at least one galvanic cell to the electronic evaluation unit. Particularly the use of at least one ribbon line as a transmission element from the cell connecting element to the electronic evaluation unit allows flexible arrangement of the transmission apparatus within the storage battery installation space, so that the entire storage battery or the entire battery can consequently be provided with the smallest possible dimensions too. The electronic evaluation unit advantageously extends above along the galvanic cell or the cell module and is advantageously arranged at least at a defined distance of a few millimeters, particularly of approximately 0.1 to 0.5 cm, away from the galvanic cell. The use of a ribbon line advantageously allows this ribbon line to be integrated into the installation space remaining between the electronic evaluation unit and the galvanic cell, as a result of which there is no need to provide additional installation space for laying the connecting lines between the galvanic cell and particularly the cell connecting element and the electronic evaluation unit. In particular, the transmission apparatus according to the invention additionally affords the advantage that the weight and volume of the battery module or storage battery can be reduced.

It is furthermore conceivable for the ribbon line to be fixed to, particularly plugged onto, a cell connecting element in nondestructively removable fashion. This means that the ribbon line itself can be plugged into or plugged onto the cell connecting element. In this case, it is conceivable for the ribbon line to be able to be mounted on and removed from the cell connecting means in accordance with requirements without there being resultant destruction of or damage to the cell connecting element and/or the ribbon line. Advantageously, simple arrangement of the ribbon line on the cell connecting element is made possible in this case, the fundamentally known contact resistance, which can be regarded as a disadvantage, between a cell connector and a transmission means for transmitting data to the electronic evaluation unit also being at least reduced and advantageously prevented.

Particularly in order to allow the ribbon line to be plugged onto or plugged into the cell connecting element, the cell connecting element advantageously has a plug-in unit, particularly a miniature circuit board, for plugging on the ribbon line. This plug-in unit is advantageously connected and particularly welded or screwed to the cell connecting element. Advantageously, the use of a plug-in unit prevents damage to or destruction of the ribbon line, particularly in the connecting region thereof, when the ribbon line is plugged into and removed from the cell connecting element.

It is furthermore conceivable for the ribbon line to be fixed, particularly welded or soldered, to the cell connecting element in destructively removable fashion. In this case, a direct connection is provided between the ribbon line, particularly a connecting region of the ribbon line, and the cell connecting element. Simple removal and simple fitting of the ribbon line from and to the cell connecting element is no longer possible in this case, however. Advantageously, however, unintentional detachment of the ribbon line from the cell connecting element is prevented in this case.

Additionally, the destructively removable fixing of the ribbon line to the cell connecting element allows the contact resistance between the ribbon line and the cell connecting element to be advantageously reduced.

Within the context of the invention, it is furthermore possible for the ribbon line to have a defined number of interconnects, the number of interconnects corresponding to the number of galvanic cells. This means that the number of interconnects of the ribbon line essentially corresponds to the number of taps required per storage battery and accordingly essentially to the number of galvanic cells in the cell module per storage battery. Advantageously, the individual interconnects of the ribbon line are insulated from one another and/or also insulated from metal housing parts. Furthermore, the interconnects of the ribbon line are sealed in the ribbon line ribbon, which is advantageously made from a plastic material. Advantageously, the use of an individual ribbon line having a defined number of interconnects simply and inexpensively allows a connection between a plurality of galvanic cells and the evaluation unit within a storage battery or battery module or cell module. Additionally, the ribbon line having a plurality of interconnects is also configured to be very flexible when deformed and advantageously geometrically thin, so that the ribbon line itself can also be arranged or laid in a manner leading away from the galvanic cell directly between the galvanic cell and the electronic evaluation unit and accordingly directly beneath the electronic evaluation unit, which is advantageously installed on a module cover. Advantageously, the use of the ribbon line prevents tearing-off or fracture, as is known when bonding wires are used, which means that use by means of ribbon lines is more reliable and more effective. The individual interconnects of the ribbon line can be welded, soldered or screwed to the cell connecting elements, for example, it also being conceivable for the individual interconnects to be able to be connected to the respective cell connecting element via an appropriate plug-in unit, however. In this case, it is conceivable for the plug-in unit itself to be configured in a manner similar to a lamp-wire terminal and to allow simple and inexpensive and also easily assemblable accommodation of the interconnects or of the corresponding interconnect of the ribbon line. One advantageous possibility is that when there are a plurality of interconnects per ribbon line, these interconnects open into a common ribbon line after connection to the cell connecting element and are routed to the electronic evaluation unit at a distance from one another in a manner running parallel next to one another.

It is additionally advantageous if at least one cell connecting element has a plug-in unit that is used to hold at least one interconnect of the ribbon line. It is also advantageous if the plug in unit is irreversibly connected to the cell connecting element, it being particularly possible for the plug-in unit to be connected to the cell connecting element in welded or soldered fashion. In other words, a simple electrical connection can be made between the plug-in unit, which is particularly irreversibly connected to the cell connecting element, and at least one interconnect of the ribbon line, the connection advantageously being in the form of a plug connection in this case. To this end, at least one interconnect of the ribbon line has one end plugged into the plug-in unit. Hence, by plugging at least one interconnect of the ribbon line into the plug-in unit, it is possible to make an easily implemented electrical contact-connection to a galvanic cell.

Additionally, the ribbon line may also be in the form of a film, the individual interconnects of the ribbon line being integrated in the flexible film. As a result, it is possible for the thickness to be reduced further. Hence, it is additionally advantageously possible to increase flexibility and to reduce weight. The individual interconnects integrated in the flexible film can be welded, soldered or screwed to the cell connecting elements, for example, it also being conceivable for the individual interconnects to be able to be connected to the respective cell connecting element via a plug-in unit described above, however.

Furthermore, it is possible for the evaluation unit to be arranged directly on the ribbon line. In other words, the evaluation unit can be arranged such that the interconnects of the ribbon line are arranged at least in part in contact with the evaluation unit, the evaluation unit being arranged particularly above the ribbon line in this case, so that the ribbon line is arranged between the evaluation unit and the galvanic cells.

Additionally, it is possible for the evaluation unit to be integrated in the ribbon line. In this case, the evaluation unit may be in the form of a circuit board that is integrated in the ribbon line. In other words, this means that the ribbon line, particularly the plastic insulation, partially encloses the evaluation unit in the form of a circuit board. This has the advantage that it reduces the complexity for assembly, since setup of the connection between the evaluation unit and the interconnects is not necessary during assembly.

Furthermore, a rechargeable energy storage unit at least for storing electric power, having at least two electrically interconnected galvanic cells and a transmission apparatus according to at least one of the preceding claims 1 to 5, is claimed. Accordingly, the rechargeable energy storage unit, which may be a storage battery or a battery, for example, has at least one transmission apparatus in accordance with the type cited above. The rechargeable energy storage unit itself can have a plurality of and particularly at least two or more galvanic cells that may be connected up to one another in series or in parallel. In this case, the individual galvanic cells are connected up by using a cell connecting element that electrically conductively connects at least two galvanic cells to one another. The cell connecting element itself advantageously has an electrically conductive material. The rechargeable energy storage unit may be a lithium ion storage battery, for example, that is used to provide electric powers in different electric devices. In this context, electric devices may be tablets, notebooks, mobile phones or comparable user devices, for example. However, it is also conceivable for the rechargeable energy storage unit to be used in an electrically drivable vehicle, which may be an electric vehicle or a hybrid vehicle. Within the context of the invention, a vehicle is advantageously understood to mean a land vehicle, such as an automobile, or a truck, the term vehicle also being able to be understood to mean a water vehicle, such as a ship, for example, or an aircraft, such as an airplane, for example.

The rechargeable energy storage unit described results in all of the advantages that have already been described for a transmission apparatus according to the first aspect of the invention.

Furthermore, the use of at least one ribbon line for transmitting electrical signals from at least one galvanic cell to at least one electronic evaluation unit is claimed. Furthermore, it is possible not only for the ribbon line itself to be used to transmit the values or data and signals for the voltage and/or the temperature of the individual galvanic cell to an electrical evaluation unit, but also for additional ribbon lines to be arranged between individual electronic evaluation units of a battery cell module or of a storage battery pack, for example, in order to transmit communication signals between the electronic evaluation units. It is furthermore conceivable for ribbon lines to be used as transmission lines between the electronic evaluation units or the at least one electronic evaluation unit and the control unit. On account of the small geometric dimensioning of the ribbon lines, it is therefore possible to integrate a plurality of ribbon lines within a single battery cell module, said plurality of ribbon lines allowing process-reliable data transmission or transmission of the voltage values and/or temperature values from the individual galvanic cells in a space-saving and simple manner and also on account of neat routing of the individual interconnects.

The described use of a ribbon line for transmitting electrical signals results in all of the advantages that have already been described for a transmission apparatus and/or a rechargeable energy storage unit according to the first aspects of the invention.

BRIEF DESCRIPTION OF THE DRAWINGS

Embodiments of a transmission apparatus according to the invention and of a rechargeable energy storage unit according to the invention are explained in more detail below with reference to drawings, in which, in each case schematically.

DETAILED DESCRIPTION

Figure 1:
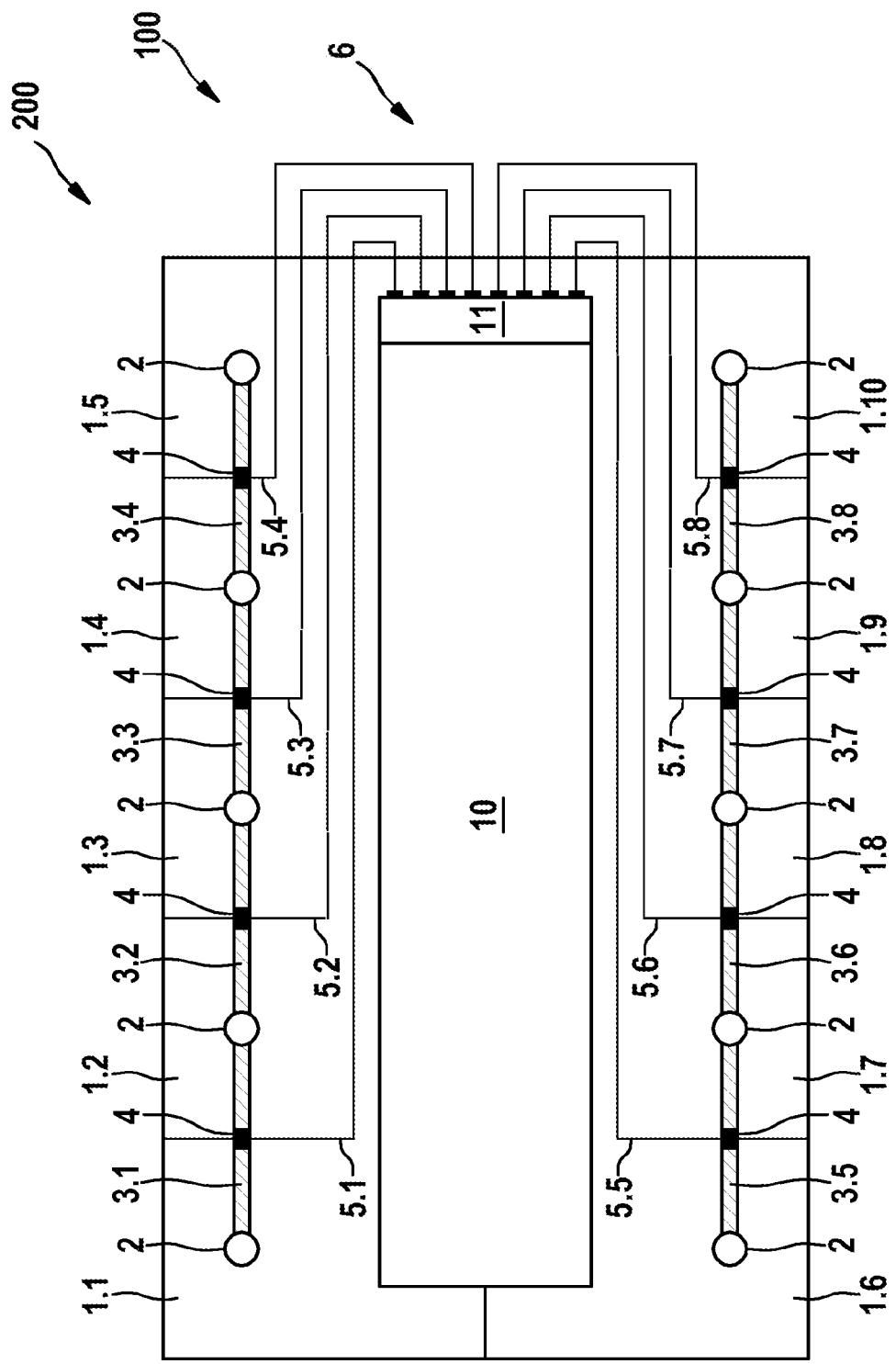
FIG. 1 shows a plan view of a first arrangement of an embodiment of the transmission apparatus according to the invention on an embodiment of a rechargeable energy storage unit.
Figure 2:
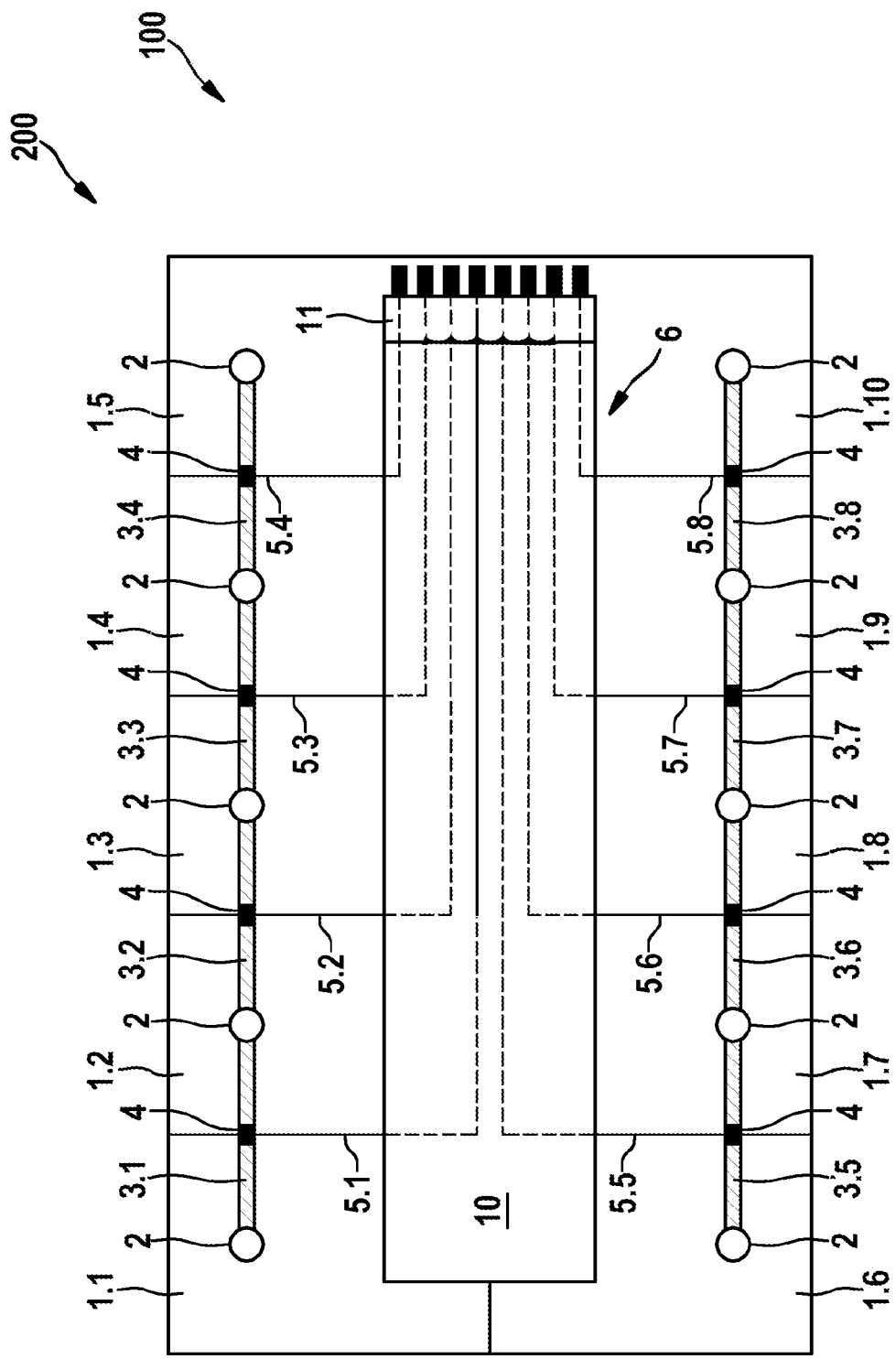
FIG. 2 shows a plan view of a further arrangement of an embodiment of the transmission apparatus according to the invention on an embodiment of a rechargeable energy storage unit.

Elements having the same function and action are each provided with the same reference symbols in FIGS. 1 and 2.

FIG. 1 shows an embodiment of a rechargeable energy storage unit 200 that has a plurality of galvanic cells 1.1 to 1.10 that are connected up to one another in the form of a cell module and particularly a battery cell module or storage battery cell module. Each galvanic cell 1.1 to 1.10 has at least two terminals 2, only one terminal 2 of each galvanic cell 1.1 to 1.10 being visible in FIG. 1. The reason for this is that particularly the electronic evaluation unit 10 is arranged above the individual galvanic cells 1.1 to 1.10, and consequently conceals one of the two terminals 2 of each galvanic cell 1.1 to 1.10. The galvanic cells 1.1 to 1.10 are connected up to one another by appropriate cell connecting elements 3.1 to 3.8 in order to transmit electric power to one another. The cell connecting elements 3.1 to 3.8 extend between the terminals 2 of the individual galvanic cells 1.1 to 1.10. This means that at least two galvanic cells 1.1 to 1.10 are connected up to one another via a respective cell connecting element 3.1 to 3.8. Within the context of the invention, it is of no significance whether the galvanic cells 1.1 to 1.10 are connected up to one another in series or in parallel. Both types of interconnection are possible and do not influence the present invention and particularly the use of the transmission apparatus 100.

The embodiment shown in FIG. 1 for the transmission apparatus 100 according to the invention has particularly a cell connecting element 3.1 to 3.4 and a plurality of ribbon lines 6 or a plurality of interconnects 5.1 to 5.8 of a ribbon line 6. Each cell connecting element 3.1 to 3.8 advantageously has a voltage tap section 4, which may be configured in the form of a plug-in unit, for example, such as particularly a miniature circuit board. However, it is also conceivable for the voltage tap section 4 to be merely a weld or solder section to which particularly an interconnect 5.1 to 5.8 of the ribbon line 6 is welded or soldered. Consequently, it is conceivable for the ribbon lines represented by the reference symbols 6 to be individual ribbon lines that each have at least one individual interconnect, the interconnects 5.1 to 5.8 extending from a voltage tap section 4 of a respective cell connecting element 3.1 to 3.8 to the electronic evaluation unit 10, particularly a connecting region 11 of the electronic evaluation unit 10, and being connected to or plugged on or welded or even soldered to said connecting region.

However, it is also conceivable for the ribbon lines shown by the reference symbols 6 to be just individual interconnects of an individual or single ribbon line 6, the individual interconnects of the ribbon line advantageously being fitted together from the voltage tap section 4 of the individual cell connecting elements 3.1 to 3.8 to form a common ribbon line 6 that is connected to the electronic evaluation unit 10 in the connecting region 11 of the electronic evaluation unit 10. In this case, the individual interconnects are advantageously incorporated in the plastic film and are insulated thereby. Consequently, individual interconnect ribbon lines 6 merge into a common ribbon line. To this end, the electronic evaluation unit 10 also has, particularly in the connecting region 11 thereof, an appropriate plug-in unit in order to allow the ribbon line or the interconnects thereof and the electronic evaluation unit 10 to be fitted together in a simple manner.

As shown particularly in FIG. 1, it is possible for the ribbon line or ribbon lines 6 and the interconnects 5.1 to 5.8 thereof to be arranged at the side of the electronic evaluation unit 10, which extends along the galvanic cells 1.1 to 1.10. Consequently, the ribbon lines 6 fill an interspace extending between the electronic evaluation unit 10 and the cell connecting elements 3.1 to 3.8.

However, it is also conceivable for the ribbon lines 6 or particularly the interconnects 5.1 to 5.8, which gather to form a common ribbon line 6, to be arranged beneath the electronic evaluation unit 10 and particularly in an interspace between the electronic evaluation unit 10 and a surface of the galvanic cells 1.1 to 1.10, as shown in FIG. 2, in particular. The ribbon lines 6, or interconnects 5.1 to 5.8 of the ribbon line 6, running beneath the electronic evaluation unit 10 are shown in dashes. In this case, the interspace remaining between the electronic evaluation unit 10 and the surface of the individual galvanic cells 1.1 to 1.10 is advantageously utilized in order to arrange the ribbon lines 6 or the individual interconnects 5.1 to 5.8 thereof. The further design of the rechargeable energy storage unit 200 and of the transmission apparatus 100, as shown in FIG. 2, essentially corresponds to the design of the transmission apparatus 100 or rechargeable energy storage unit 200 that is shown in FIG. 1. Accordingly, reference in this regard is made to the comments made in respect of FIG. 1.

Additionally, it is possible for the ribbon lines 6 or particularly the interconnects 5.1 to 5.8 to be arranged over gas release valves of the galvanic cells 1.1 to 1.10. This allows a space-saving arrangement of the ribbon lines 6 to be implemented. Additionally, other arrangements are also conceivable that allow a space-saving arrangement of the interconnects 5.1 to 5.8.

LIST OF REFERENCE SYMBOLS

1.1-1.10 galvanic cell
2 terminal
3.1-3.8 cell connecting element
4 voltage tap section
5.1-5.8 ribbon line/interconnects of the ribbon line
10 electronic evaluation unit
11 connecting region of the electronic evaluation unit
100 transmission apparatus
200 rechargeable energy storage unit

The invention claimed is:

1. A rechargeable energy storage unit (200) at least for storing electric power, having a plurality of galvanic cells (1.1-1.10) and a transmission apparatus (100) for transmitting electrical signals from the plurality of galvanic cells (1.1-1.10) to at least one electronic evaluation unit (10), wherein the transmission apparatus (100) comprises a number of cell connecting elements (3.1-3.8), each of the cell connecting elements (3.1-3.8) corresponding to and electrically connecting a respective two of the plurality of galvanic cells (1.1-1.10) to enable the respective two of the plurality of galvanic cells to transmit electric power to one another, and wherein the transmission apparatus (100) also comprises a ribbon line (6) arranged directly on the cell connecting elements (3.1-3.8), the ribbon line (6) extending from the cell connecting elements (3.1-3.8) to the electronic evaluation unit (10) for evaluating the electrical signals, wherein the ribbon line (6) has a defined number of interconnects (5.1-5.8), wherein the number of interconnects (5.1-5.8) corresponds to the number of cell connecting elements (3.1-3.8), and wherein each of the interconnects (5.1-5.8) is arranged directly on a respective one of the cell connecting elements (3.1-3.8).

2. The rechargeable energy storage unit (200) as claimed in claim 1, characterized in that the ribbon line (6) is fixed to at least one of the cell connecting elements (3.1-3.8) in nondestructively removable fashion.

3. The rechargeable energy storage unit (200) as claimed in claim 2, characterized in that the at least one of the cell connecting elements (3.1-3.8) has a plug-in unit for plugging on the ribbon line (6).

4. The rechargeable energy storage unit (200) as claimed in claim 2, characterized in that the at least one of the number of cell connecting elements (3.1-3.8) has a miniature circuit board for plugging on the ribbon line (6).

5. The rechargeable energy storage unit (200) as claimed in claim 1, characterized in that the ribbon line (6) is fixed to at least one of the cell connecting elements (3.1-3.8) in destructively removable fashion.

6. The rechargeable energy storage unit (200) as claimed in claim 1, characterized in that the ribbon line (6) is plugged onto at least one of the number of cell connecting elements (3.1-3.8) in nondestructively removable fashion.

7. The rechargeable energy storage unit (200) as claimed in claim 1, characterized in that the ribbon line (6) is welded on or soldered on the cell connecting elements (3.1-3.8) in destructively removable fashion.

8. A method for transmitting electrical signals from at least one a plurality of galvanic cells (1.1-1.10) to at least one electronic evaluation unit (10), the method comprising:
providing a rechargeable energy storage unit (200) at least for storing electric power having the plurality of galvanic cells (1.1-1.10) and a transmission apparatus (100) for transmitting electrical signals from the plurality of galvanic cells (1.1-1.10) to the at least one electronic evaluation unit (10), wherein the transmission apparatus (100) comprises a number of cell connecting elements (3.1-3.8), each of the cell connecting elements (3.1-3.8) corresponding to and electrically connecting a respective two of the plurality of galvanic cells (1.1-1.10) to enable the respective two of the plurality of galvanic cells to transmit electric power to one another, and wherein the transmission apparatus (100) also comprises a ribbon line (6) arranged directly on the cell connecting elements (3.1-3.8), the ribbon line (6) extending from the cell connecting elements (3.1-3.8) to the electronic evaluation unit (10) for evaluating the electrical signals, wherein the ribbon line (6) has a defined number of interconnects (5.1-5.8), wherein the number of interconnects (5.1-5.8) corresponds to the number of cell connecting elements (3.1-3.8), and wherein each of the interconnects (5.1-5.8) is arranged directly on a respective one of the cell connecting elements (3.1-3.8): and
using the ribbon line to transmit the electrical signals from the plurality of galvanic cells to the at least one electronic evaluation unit (10).

* * * * *